United States Patent [19]
Gibson

[11] Patent Number: 5,226,308
[45] Date of Patent: Jul. 13, 1993

[54] SYSTEM FOR TESTING BEARINGS

[75] Inventor: John C. Gibson, Huntsville, Ala.

[73] Assignee: The United States of America as represented by the Administrator of the National Aeronautics and Space Administration, Washington, D.C.

[21] Appl. No.: 813,628

[22] Filed: Dec. 26, 1991

[51] Int. Cl.$^5$ ............................................ G01N 19/02
[52] U.S. Cl. ........................................................ 73/9
[58] Field of Search ........................................ 73/9, 10

[56] References Cited

U.S. PATENT DOCUMENTS

| | | | |
|---|---|---|---|
| 2,623,384 | 12/1952 | Pigott | 73/10 |
| 2,808,563 | 10/1957 | Hornbostel | 73/10 |
| 4,038,863 | 8/1977 | Mellor et al. | 73/9 |

Primary Examiner—Robert Raevis
Attorney, Agent, or Firm—Robert L. Broad, Jr.; John R. Manning; Guy M. Miller

[57] ABSTRACT

A system for testing bearings wherein a pair of spaced bearings provide support for a shaft on which is mounted a bearing to be tested, with a bearing holder spaced from and in alignment with the pair of bearings. The bearing holder is provided with an annular collar positioned in an opening in the bearing holder for holding the bearing to be tested. A screw threaded through the bearing holder into engagement with the collar can be turned to move the collar radially out of alignment with the pair of bearings to apply a radial load to the bearing.

6 Claims, 1 Drawing Sheet

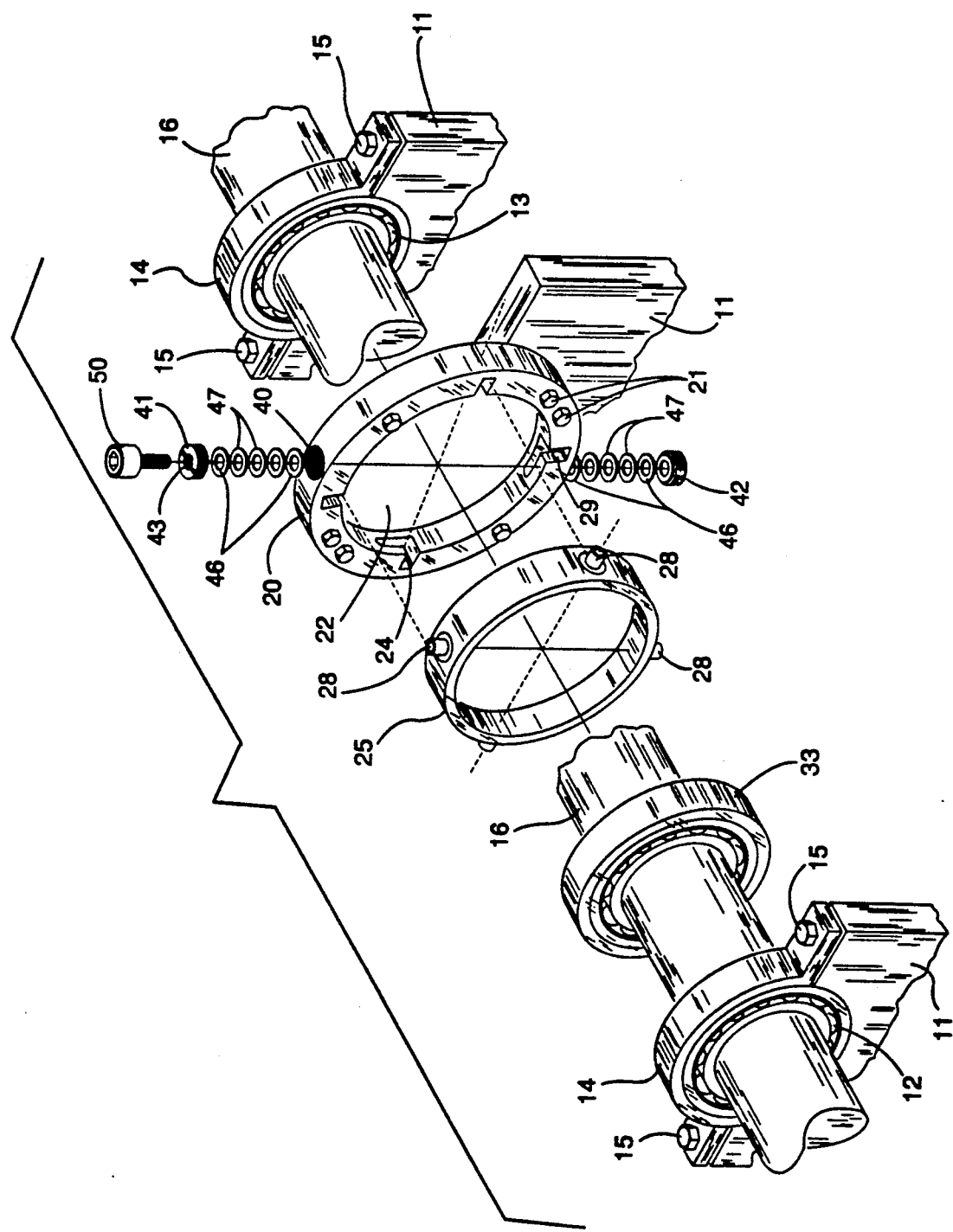

SYSTEM FOR TESTING BEARINGS

ORIGIN OF THE INVENTION

The invention described herein was made by an employee of the U.S. Government and may be manufactured and used by or for the Government of the United States of America without the payment of any royalties thereon or therefor.

BACKGROUND OF THE INVENTION

1. Field of the Invention

This invention relates to systems for testing bearings.

2. Prior Art

It is desirable to test bearings, especially those to be used under critical conditions, to determine the durability and life of the bearing under various loads. Usually a radial load is applied to the bearing and it is run under the radial load.

One method of applying a radial load to a bearing is to used a fluid cylinder to apply a radial force to the bearing. This disadvantage of this approach is that it is difficult to apply a precise load using a cylinder. Also, it is very difficult to make small variations in the load when a cylinder is used to load the bearing.

SUMMARY OF THE INVENTION

A system for testing a bearing under radial loads wherein a pair of spaced coaxial bearings provide support for a shaft on which is mounted a bearing to be tested, with a bearing holder spaced from and in alignment with the pair of bearings. The bearing holder is provided with an annular collar positioned in an opening in the bearing holder for holding the bearing to be tested. A screw threaded through the bearing holder into engagement with the collar can be turned to move the collar radially out of alignment with the pair of bearings to apply a radial load to the bearing.

DESCRIPTION OF THE DRAWING

The single figure is an exploded view of the bearing testing system showing the relationship of the various parts of the system.

DETAILED DESCRIPTION OF THE INVENTION

Referring now in detail to the drawing, there is shown a base 11 which supports a pair of spaced bearings 12 and 13 which are held on the base by collars 14 and bolts 15. The bearings 12 and 13 are in coaxial alignment for supporting a shaft 16 for rotation in these bearings.

A bearing holder 20 secured to the base 11 by bolts 21 is provided with a cylindrical opening 22 in alignment with the bearings 12 and 13 for receiving and holding an annular collar 25, the collar being loosely held in the holder 20 in such a manner that the collar can be moved to a position out of coaxial alignment with the bearings 12 and 13.

The collar 25 is provided with a plurality of spaced studs 28 which fit into L-shaped slots 29 in the inner surface of the bearing holder 20. To install the collar in the bearing holder 20, the collar is positioned so that studs 28 will, as the collar is moved in an axial direction, slide into the open ends of the slots 29 until the collar is in the plane of the holder 20 and then the collar 25 is rotated clockwise (as seen in the drawing) until the studs 28 engage the ends of the L-shaped slots 29.

A bearing 33 to be tested is fitted onto the shaft 16 and slipped into the collar 25, the fit of the bearing in the collar 25 and the shaft 16 being such that the outer race of the bearing 33 remains stationary while the inner race turns with the shaft 18.

The bearing holder 20 is provided with a pair of threaded holes 40 positioned on opposite sides of the holder 20 in alignment with a pair of the L-shaped slots 29, so that when the collar 25 is installed in the holder 20 a pair of the studs 28 are aligned coaxially with the holes 40.

A pair of plugs 41 and 42 are threaded into the holes 40, with the plug 41 having a concentric threaded bore extending axially therethrough. Flat washers 46 and Belleville washers 47 sandwiched between the flat washers are positioned in the threaded holes 40 between the plugs 41 and 42 and the collar 25. A Belleville washer is a resilient washer having a frustoconical configuration which flattens when a load is applied to the washer. By adjusting the positions of the plugs 41 and 42 in the holes 40, the collar can be moved to a position in coaxial alignment with the bearings 12 and 13. A spanner wrench (not shown) can be used to turn the plugs 40 and 41 for adjusting their positions in the holes 40.

An adjusting screw 50 threaded through the plug 41 can be turned to engage the end of the stud 28 in alignment with the adjusting screw. Further downward movement of the screw 50 applies a force to move the collar 25 to carry the bearing 33 to a position out of coaxial alignment with the bearings 12 and 13. This forces the shaft 16 to bend slightly and apply a radial load to the bearing 33. This radial load can be raised or lowered by adjustment of the position of the screw 50. The shaft is then driven at a predetermined speed for a predetermined time interval to test the bearing 33.

What is claimed is:

1. A system for testing a bearing, comprising
   a. a base,
   b. a pair of spaced bearings mounted on the base, said bearings being in coaxial alignment with each other for receiving a shaft,
   c. a bearing holder mounted on the base in alignment with said pair of bearings,
   d. a collar positioned on the bearing holder and having therein an opening for receiving a bearing to be tested,
   e. means on the collar and bearing holder for locking said collar to said bearing holder to prevent rotation of said collar,
   f. flexible means mounted on the bearing holder and in engagement with the collar for allowing radial movement of the collar to carry the bearing to be tested into and out of coaxial alignment with the pair of bearings, and
   g. a screw threaded through the bearing holder into engagement with the collar for moving the collar radially to move the bearing being tested out of alignment with said pair of bearings to thereby radially load the bearing to be tested.

2. The bearing tester of claim 1 wherein the locking means comprises a plurality of spaced studs around the periphery of said collar, said bearing holder being provided with slots for receiving said studs to hold and prevent rotation of the collar.

3. The bearing tester of claim 2 wherein a pair of said studs are positioned 180 degrees apart on the periphery of the collar and the holder is provided with a pair of threaded holes in alignment with said pair of studs with a pair of plugs threaded into said holes such that the plugs can be moved in said holes to move the collar into coaxial alignment with said pair of bearings.

4. The bearing tester of claim 3 wherein said flexible means is a plurality of resilient washers are positioned between each of the plugs and the collar.

5. The tester of claim 4 wherein said slots in said holder are L-shaped.

6. A system for testing bearings, comprising
   a. a base,
   b. a pair of spaced bearings mounted on the base, said bearings being in coaxial alignment with each other for receiving a shaft,
   c. a bearing holder mounted on the base and having therein a cylindrical opening in alignment with said pair of bearings, said holder having therein a pair of L-shaped slots in communication with said cylindrical opening, said slots being in diametrically opposed positions,
   d. a collar mounted in the opening in said holder and having a central cylindrical opening for receiving a bearing to be tested,
   e. said collar having a pair of radially extending studs each positioned in one of the pair of slots for holding the collar in said holder, said holder having therein a pair of threaded holes in alignment with said studs,
   f. a pair of plugs threaded into said threaded holes, one of said plugs having therein an axial threaded bore,
   g. a plurality of resilient washers positioned between each of the plugs and the collar for resiliently holding the collar in a position determined by the positioning of the plugs in the threaded holes, and
   h. a screw threaded through said threaded bore for engaging one of the studs to force the collar into a position out of alignment with the pair of bearings to load the bearing to be tested.

* * * * *